United States Patent [19]

Doss

[11] 4,224,436
[45] Sep. 23, 1980

[54] ORGANO SELENIUM AND/OR ORGANO TELLURIUM CURING AGENT FOR MERCAPTAN POLYMER-CONTAINING SEALANT

[75] Inventor: Richard C. Doss, Bartlesville, Okla.

[73] Assignee: Phillips Petroleum Company, Bartlesville, Okla.

[21] Appl. No.: 39,060

[22] Filed: May 11, 1979

[51] Int. Cl.$^2$ .................... C08G 63/14; C08G 63/68
[52] U.S. Cl. .................................. 528/275; 156/332; 428/480; 528/272; 528/293
[58] Field of Search .................. 528/272, 275, 293; 156/332

[56] References Cited

U.S. PATENT DOCUMENTS

| | | | |
|---|---|---|---|
| 2,549,565 | 12/1970 | Jones et al. | 528/293 |
| 2,956,985 | 10/1960 | Scruggs et al. | 528/275 |
| 3,654,241 | 4/1972 | Doughty et al. | 260/30.4 R |
| 3,705,882 | 12/1972 | Skillicorn | 260/79 |
| 3,795,655 | 3/1974 | LeClaire et al. | 260/45.8 N |
| 3,817,936 | 6/1974 | Jones et al. | 528/293 |
| 3,849,381 | 11/1974 | Doss et al. | 528/293 |
| 3,991,039 | 11/1976 | Gunter et al. | 260/33.6 R |
| 4,016,332 | 5/1977 | Anderson et al. | 428/500 |
| 4,113,707 | 9/1978 | Louthan et al. | 528/293 |

FOREIGN PATENT DOCUMENTS 1062849 3/1967 United Kingdom ................ 528/275

*Primary Examiner*—Walter C. Danison

[57] ABSTRACT

At least one of an organo selenium and an organo tellurium curing agent is incorporated with a sealant comprising essentially a mercaptan-terminated polyether-polyester liquid polymer. In one embodiment there is provided a sealant composition comprising at least one of a selenium and tellurium N-substituted dithiocarbamate curing agent. Final compositions are obtained having improved thermal stability at temperatures of the order of 150° C.

10 Claims, No Drawings

ORGANO SELENIUM AND/OR ORGANO TELLURIUM CURING AGENT FOR MERCAPTAN POLYMER-CONTAINING SEALANT

BRIEF SUMMARY OF THE INVENTION

Mercaptan polymer-containing sealants are cured by incorporating metal dithiocarbamates as curing agents.

DETAILED DESCRIPTION

This invention relates to a sealant composition containing a mercaptan-terminated polyether-polyester liquid polymer. In one of its aspects the invention relates to the provision of a sealant composition having improved thermal stability by providing therein a curing agent novel for the purpose.

In one of its concepts, the invention provides a method of producing a final sealant composition, the method essentially comprising bringing together a mercaptan-terminated polyether-polyester liquid polymer and at least one of an organo selenium and an organo tellurium curing agent or compound. In another of its concepts, the invention provides a sealant composition in which the curing agent is at least one of a selenium-and tellurium N-substituted dithiocarbamate.

Liquid mercaptan polymers having at least two terminal mercaptan groups can be easily cured to rubbery elastomers having excellent resistance to weathering, oil, ozone, and water. Because of these properties, polymers having at least two terminal mercaptan groups have been widely used as sealants and adhesives as well as in many other applications.

However, even though liquid mercaptan-terminated polymers may be cured to elastomers having very desirable properties, they have in the past suffered a disadvantage: namely high temperature stability, particularly above about 121° C. (250° F.). Although this property may not be necessarily needed in many sealant application areas such as the exterior joints of buildings and homes, there are applications wherein such a property is important, for example, appliances (dishwashers, driers, washing machines, ovens, refrigerators) and automobiles, especially under the hood.

In recent years, the environmental temperatures of sealants and other elastomeric products (i.e. gaskets, seals, etc.) in use under the hood of automobiles, especially those in the U.S., have increased markedly due to the use of higher engine compression ratios (and thus higher engine operating temperatures) and more auxiliary equipment, particularly air conditioning equipment. Whereas, operating temperatures were formerly on the order of 93°–121° C. (200°–250° F.), they now approach and even exceed 149° C. (300° F.).

At such temperatures, there are tremendous oxidation and thermal degradational stresses which tend to decompose the sealant or elastomeric product exposed thereto. Hence, there is a continuing search for elastomeric products, particularly sealants, with higher and higher thermal stability.

It is an object of this invention to provide a sealant composition. It is another object of this invention to provide a sealant composition comprising a mercaptan-terminated polyether-polyester liquid polymer and a curing agent resulting in a final composition having significantly improved thermal stability. Another object of the invention is to provide a novel curing compound or agent for a mercaptan-terminated polyether-polyester liquid polymer. A further object of the invention is to provide a method for curing a mercaptan-terminated polyether-polyester liquid polymer.

Other aspects, concepts, objects and the several advantages of this invention are apparent from a study of this disclosure and the appended claims.

According to the present invention, there are provided a composition and a method for preparing the same comprising essentially as ingredients lending sealant properties to the final composition at least one mercaptan-terminated polyether-polyester liquid polymer and a curing amount of at least one of an organo selenium and an organo tellurium compound.

Also, according to the invention, in a now preferred embodiment thereof, the selenium or tellurium compound is an N-substituted dithiocarbamate curing agent.

Mercaptan-terminated Polymers

Polymers useful in this invention are those which are comprised of at least two but preferably more than two pendant thiol groups per molecule and which have a plurality of ether (alkoxy) and ester groups with one monosulfide linkage. These type polymers are generally described in U.S. Pat. No. 3,817,936 issued June 18, 1974, F. B. Jones and O. L. Marrs, incorporated herein by reference, as being prepared by the esterification of a poly(oxyalkylene)-polyol with a mixture of mercaptoalkanoic acids and thiol alkanoic acids to form a poly-(oxyalkylene)-polyester-poly(monosulfide)-polythiol.

A now more preferred method of preparation of the mercaptan-terminated polymers of this invention is described in a pending application Ser. No. 720,474 where at least one alkyl mercaptocarboxylate and at least one dialkyl thiodicarboxylate is treated in the presence of a tetralkyl titanate transesterification catalyst with a poly(oxyalkylene)-polyol having more than two hydroxy groups per molecule to give a poly(oxyalkylene)-polyester-poly(monosulfide)-polythiol having more than two pendant mercaptan groups per molecule.

Alkyl mercaptocarboxylates which are generally employed in the preparation of mercaptan-terminated polymers useful to this invention include those of general formula

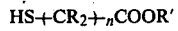

where R' is an alkyl radical containing from 1 to 5 carbon atoms, wherein R is hydrogen or R', wherein n is an integer having a value in the range 1–5 and wherein formula I contains a maximum of 10 carbon atoms in all R groups per molecule.

Examples of useful alkyl mercaptocarboxylates include
methyl mercaptoacetate,
methyl 2-mercaptopropionate,
methyl 3-mercaptopropionate,
ethyl 4-mercaptobutyrate
n-butyl 6-mercaptohexanoate,
isopropyl 6-mercaptoundecanoate,
n-pentyl 6-mercapto-2-(2,2-dimethylpropyl) undecanoate,
t-butyl 2-mercapto-2-methylheptanoate,
methyl 3,3-dimethyl-6-mercaptohexanoate,
n-propyl 6-mercapto-2,2,3,3,4,4,5,5,6-nonamethylheptanoate
and the like and mixtures thereof.

Dialkyl thiodicarboxylates which can be employed in the preparation of mercaptan-terminated polymers useful in this invention are represented by Formula II.

$$R'OOCCR_2 +_n S - CR_2 +_n COOR' \qquad II$$

wherein R,R' and n are as defined above; with a total of no more than 20 carbon atoms for all R groups in a molecule.

Specific examples of useful dialkyl thiodicarboxylates include dimethyl thiodiacetate,
dimethyl 3,3'-thiodipropionate,
diethyl 4,4'-thiodibutyrate,
di-n-butyl 6,6'-thiodihexanoate,
diisopropyl 6,6'-thiodiundecanoate,
di-n-pentyl 6,6'-thiobis [2-(2,2-dimethylpropyl)undecanoate],
di-t-butyl 2,2'-thiobis (2-methylheptanoate),
dimethyl 6,6'-thiobis (3,3-dimethylhexanoate),
di-n-propyl 6,6'-thiobis (2,2,3,3,4,4,5,5,6-nonamethylheptanoate),
dimethyl ester of 3-[(carboxymethyl) thio] propionic acid and the like and mixtures thereof.

Poly(oxyalkylene)-polyols useful in the preparation of polymers described in this invention are fully described in U.S. Pat. No. 3,817,936 col. 4, line 24 to col. 5, line 43.

Thus, the poly(oxyalkylene)-polyols or polyhydroxy polyethers employed according to the invention have on average more than two and generally at least on the average 2.5, preferably at least three, pendent hydroxy groups per molecule. Such polyhydroxy polyethers or poly(oxyalkylene)polyols have more than two, preferably three to about twelve, hydroxyl groups per molecule and molecular weights of from about 200 to about 20,000. These materials can be produced by the reaction of one or more epoxy-substituted hydrocarbons of the general formulas:

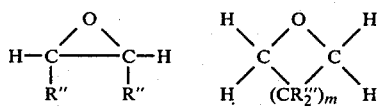

with a polyol of the general formula:

$$Y(OH)_x$$

wherein either R" can be H or alkyl with the total number of carbon atoms in the molecule being in the range of up to and including about 20; wherein R'" can be alkyl or H with the total number of carbon atoms per molecule being in the range of up to and including about 20; and wherein m can be an integer of from 1 to about 10, preferably 1 to 3; and wherein Y can be a hydrocarbon moiety with at least two and ordinarily from 3 to 40 carbon atoms per moiety and a valence equal to the value of x, x is an integer of at least two and ordinarily from 3 to about 20, and the number of carbon atoms per molecule of $Y(OH)_x$ is equal to or greater than x.

Polyols that are employed in the preparation of the poly(oxyalkylene)-polyols or polyhydroxy polyethers of this invention comprise hydroxy-substituted hydrocarbons that are preferably saturated aliphatics, saturated cycloaliphatics, aryls, or combinations thereof that are substituted with more than two and preferably at least three hydroxyl groups per molecule. In the presently preferred embodiment of this invention, these polyols $Y(OH)_x$, can have from two up to about 12 hydroxyl groups per molecule, and can contain from 3 to about 20 carbon atoms per molecule. Illustrative of the polyols of this invention that can be represented by the general formula, $Y(OH)_x$, are ethylene glycol,
1,3-propanediol,
2-butene-1,4-diol
1,4-cyclohexanediol,
2-ethylhexane-1,3-diol
glycerine
pentaerythritol,
erythritol,
1,3,8-trihydroxycyclodedecane,
estriol,
1,4,5,8-naphthalenetetrol,
di(p-hydroxyphenyl)phenyl methanol,
1,2,6-hexanetriol,
1,2,4,6,7,9,12,14,15,17,19,20-eicosanedodecol, and the like.

The poly(oxyalkylene)-polyols or polyhydroxy polyethers of this invention can be prepared by contacting at least one polyol of the formula $Y(OH)_x$, as defined above, with an epoxy-substituted hydrocarbon, as defined above, under suitable polymerization conditions, as is known to the art. For instance, glycerine can be contacted with an excess of propylene oxide (1,2-epoxypropane) under elevated pressure and in the presence of suitable polymerization promoters. Products of this type can also be obtained from commercial sources. Niax Polyol LHT-67 (a trademark) is a commercial product of this type. In the preparation of poly(oxyalkylene)-polyols having on average more than two pendent hydroxyl groups per molecule, mixtures of the above polyols such as at least one diol and another polyol can be reacted with the epoxy-substituted hydrocarbons defined above to form poly(oxyalkylene)-polyols having more than two pendent hydroxy groups on average per molecule. For instance, a mixture of 1,4-butanediol and 1,2,6-hexanetriol can be reacted with ethylene oxide to produce a poly(oxyethylene)-polyol having an average of more than two pendent hydroxy groups per molecule. Alternatively, a poly(oxyalkylene)-polyol produced, e.g. by the reaction of a diol such as ethylene glycol with an alkylene oxide such as propylene oxide, can be mixed with another poly(oxyalkylene)-polyol produced, e.g., by the reaction of a triol such as 1,2,6-hexanetriol with an alkylene oxide such as propylene oxide. As yet another alternative, up to about 30 weight percent of the poly(oxyalkylene)-polyol can be replaced with a polyol having recurring ester linkages, e.g., an average of about 2 to about 5 ester linkages per molecule, in place of at least a portion of the ether linkages, produced, e.g. by reaction of a lactone such as caprolactone with a polyol such as ethylene glycol or with an alkylene oxide-polyol condensation product such as diethylene glycol.

Illustrative examples of the epoxy-substituted hydrocarbons of the above-defined formulas that can be employed with the polyols to form the poly(oxyalkylene)-polyol include 1,2-epoxypropane,
1,2-epoxyethane,
1,2-epoxydocosane,
10,11-epoxydocosane,
2,3-epoxy-4,5-dimethyldodecane,
1,3-epoxypropane, 1,12-epoxydodecane,
1,12-epoxy-2,11-dibutyldodecane,
1,4-epoxy-2-(2,2-dimethyltetradecyl)butane
and the like.

Transesterification catalysts employed for the transesterification of the mixtures of alkyl mercaptocarboxylate and dialkyl thiodicarboxylate with poly(oxyalkylene)-polyols used in the preparation of polymers useful in this invention include those of Formula IV.

$$M(OR'''')_4 \qquad\qquad IV$$

wherein R'''' is an alkyl group having from 1 to 10 carbon atoms and M is titanium or zirconium. It is presently preferred to employ tetralkyl titanates of Formula IV wherein M is titanium and the R'''' groups contain from 3 to 8 carbon atoms per group.

Mixtures of alkyl mercaptocarboxylates and dialkyl thiodicarboxylates employed in the preparation of polymers useful in this invention will generally contain from 5 to 95 weight percent alkyl mercaptocarboxylate. However, it is preferred to employ mixtures containing from 50 to 75 weight percent alkyl mercaptocarboxylate.

It may also occasionally be desirable to have present in the mixture of alkyl mercaptocarboxylate and dialkyl thiodicarboxylate a small amount of dialkyl dithiodicarboxylate. Such mixtures are within the scope of this invention.

In order to improve efficiency of the transesterification reaction it is frequently desirable to exclude materials which are detrimental to the reaction. For example, water is detrimental to the reaction and be excluded by means well-known in the art such as purging the poly(oxyalkylene)-polyol at elevated temperatures (i.e. 100° C.) prior to use with a dry, inert gas.

The transesterification reaction is conviently run in the absence of a diluent. However, if desired inert diluents such as benzene, toluene, the xylenes, pentane, hexane, and the like can be employed.

In the preparation of the polymers useful in this invention it is convenient to employ the mixed esters (alkyl mercaptocarboxylate and dialkyl thiodicarboxylate) and poly(oxyalkylene)-polyol in amounts ranging from 1.0 to 1.1 equivalents of ester group in the mixed esters per equivalent of hydroxy group in the poly(oxyalkylene)-polyol, and preferably from 1.03 to 1.06 equivalents of ester per equivalent of hydroxy. The transesterification catalyst is generally employed in an amount ranging from 0.1 to 4 and preferably 0.2 to 2 grams of catalyst per gram equivalent of hydroxy groups in the poly(oxyalkylene)-polyol.

The transesterification reaction is normally carried out in the temperature range of 125° to 235° C. and preferably from 165° to 225° C. for a time period ranging from 0.5 to 72 hours.

It is preferred to run the transesterification reaction in the absence of a diluent, with appropriate amounts of reactants and under suitable conditions of time, temperature and pressure such that at the completion of the transesterification reaction as evidenced by the cessation of evolution of R'OH, the poly(oxyalkylene)-polyester-poly(monosulfide)-polythiol will require no further treatment working prior to use. If, however, further purification or treatment of the product is desired, then well-known art procedures such as washing, solvent extraction, etc., may be employed to provide a product with the desired degree of purity.

Curing Agents

Curing agents useful in the present invention are limited to sulfur-containing organo selenium or tellurium compounds and more specially to selenium or tellurium N-substituted dithiocarbamates having the general formula represented by the formula V $$[(R^1R^2)_2NCSS]_4M \qquad\qquad V$$

wherein $R^1$ and $R^2$ can be selected from the group consisting of hydrogen, alkyl, or cycloalkyl radical consisting from $C_1$ to $C_{12}$ and wherein $R^1$ and $R^2$ cannot both be hydrogen; and M can be either selenium or tellurium. Representative of these type materials but limited to are, for example, selenium methyldithiocarbamate,
selenium dimethyldithiocarbamate,
selenium ethyldithiocarbamate,
selenium diethyldithiocarbamate,
selenium propyldithiocarbamate,
selenium dipropyldithiocarbamate,
selenium dibutyldithiocarbamate,
selenium dipentyldithiocarbamate,
selenium dihexyldithiocarbamate,
selenium methylethyldithiocarbamate,
tellurium methyldithiocarbamate,
tellurium dimethyldithiocarbamate,
tellurium diethyldithiocarbamate,
tellurium cyclohexyldithiocarbamate,
tellurium cyclohexylethyldithiocarbamate,
and the like.

The simple admixture of the ingredients of the composition of the invention will cause some curing. With heat the rate of cure is increased. The desired rate of cure can be determined by routine test for each composition. Generally, a temperature in the approximate range ambient to about 150° C. will be satisfactory.

Other Ingredients

Other ingredients useful in the basic formulation of the present invention that can improve properties, reduce costs, etc. are left to those skilled in the art. For example, fillers such as calcium carbonates, calcium silicates, calcium sulfates, clays, magnesium carbonates, magnesium oxides, magnesium silicates, mica, titanium dioxide, zinc oxide, zinc sulfide and the like can be used.

Plasticizers can also be used to soften or extend the formulation. Plasticizers such as chlorinated hydrocarbons, diakylphthalates, low molecular weight extender oils, and the like are examples.

Antioxidants can also be used in the formulation to reduce or inhibit oxidation before or after curing among which are, for example, substituted phenols, dialkylthiodiesters, phosphites, and phosphonates.

Thickeners can be employed to prevent the formulation from excessive sag or running before curing. Fumed silica is frequently used in sealant formulations for this purpose although other type thickening agents can be used, such as carboxymethyl cellulose, high molecular weight carboxy vinyl polymers (i.e. Carbopol$^R$), asbestos, polyolefin fibers, and other recognized thixotropic materials. Frequently, hydroxy compounds such as glycols, phenols or water are added to formulations having fumed silicas present to accelerate thickening.

General Sealant Formulation

Any formulation having the two basic ingredients of (1) the mercaptan-terminated polyether-polyester polymer and (2) the organo selenium or organo tellurium curing agent e.g. at least one of a selenium and tellurium N-substituted dithiocarbamate are within the scope of this invention. For most or usual applications of the present invention additional ingredients are added to reduce the cost and in some cases to improve handling and/or performance properties.

A basic formulation used in the present invention to illustrate operability is shown in Table I along with approximately operating ranges.

TABLE I.

| Basic Sealant Formulation | | |
|---|---|---|
| | Weight Percent | |
| Ingredient | Broad | Preferred |
| Mercaptan-Terminated Polymer | 10–90 | 25–55 |
| Plasticizer | 2–25 | 4–20 |
| Fillers | 5–75 | 20–60 |
| Thickener | 1–10 | 2–5 |
| Water | 0–5 | 0.1–2 |
| Antioxidant | 0.05–3 | 0.1–1.0 |
| Curing Agent | .05–5.0 | 0.1–2.0 |

Miscellaneous

Although the compositions in the present invention appear to be directed towards sealant type applications, it is understood that other application areas relating to elastomeric products are envisioned, such as, for example, gaskets, coatings, adhesives, rubber modifying ingredients, and the like.

The following working examples describe the preparation of the type polymers useful in the present invention and the operability of the present invention.

EXAMPLE I

Preparation of Poly(Oxyalkylene)-Polyester-Poly(Monosulfide)-Polythiol

Into a one gallon stainless steel reactor fitted with a stirrer, pressure gauge, temperature measuring device and internal cooling coil was placed methanol (600 ml), concentrated ammonium hydroxide (28 wt % $NH_3$, 21.6 gm), sulfur (12 gm) and hydrogen sulfide (816 gm). Methyl acrylate (1376 gm) was introduced into the stirred reactor over a 45 minute interval. Over the reaction period the temperature of the reaction mixture increased from 23° C. to 53° C. while the pressure decreased from 1.65 MPa to 1.15 MPa (1 megapascal=145.03 pounds/sq. in.). After an additional 30 minute period of stirring, the reactor was vented to release excess hydrogen sulfide and the remaining reaction solution was transferred to a fractionation apparatus. A total of 5 runs were made as described above. The resulting reaction mixtures were combined prior to fractional distillation.

A fraction (5889 gm) was collected over a boiling range of 87°–93° C. at 0.0066 MPa (50 mm) pressure which contained 98.6 wt % methyl mercaptopropionate (analyzed by GLC, i.e., gas-liquid chromatography). The undistilled pot residue (3005 gm) contained 85 wt % dimethylthiodipropionate and 15 wt % dimethyl dithiodipropionate (analyzed by GLC).

Into a 3 liter, stirred, heated glass reactor was added polyether polyol (550 gm of LHT-34 from Union Carbide-derived from 1,2,6-hexanetriol and propylene oxide, having a molecular weight of about 4500 and a hydroxyl number of about 34). Nitrogen (0.056 m³/hr) was bubbled through the stirred reactor contents maintained at 100° C. for one hour to remove residual water. The nitrogen flow was then reduced to 0.0056 mm³/hr, a reflux condenser was attached and methyl mercaptopropionate (25.9 gm fraction described above), sulfide-disulfide mixture (14.1 gm—undistilled pot residue described above) and tetrabutyl titanate (0.2 ml, Du Pont's Tyzor TBT) were added to the reactor. The stirred reaction mixture was maintained at 177° C. for 24 hours. The nitrogen flow through the reaction mixture swept out the by-product methanol as formed in the transesterification reaction. At the end of the 24-hour period, the reflux condenser was removed and the nitrogen flow rate was increased to 0.056 m³/hr with the temperature maintained at 177° C. for one hour to remove volatiles. The resultant poly(oxyalkylene)-polyester-poly(monosulfide)-polythiol possessed 0.88 wt % mercaptan sulfur and a viscosity of 6800 centipoise at 25° C. This polymer is herein referred to as polyether-polyester mercaptan-terminated polymer.

U.S. Pat. No. 4,113,707, issued Sept. 12, 1978, deals with the preparation of this polymer. Its disclosure is incorporated herein by this reference.

EXAMPLE II

The following example illustrates the operability of the present invention.

A sealant formulation was prepared using the following recipe and employing the polymer described in Example I.

| Sealant Formulation Recipe | | |
|---|---|---|
| Ingredients | grams | wt % |
| Polymer (from Example I) | 20.0 | 54.05 |
| Plasticizer, Chlorinated Paraffin[1] | 3.0 | 8.11 |
| Fillers, Calcium Carbonate[2] | 10.0 | 27.03 |
| Titanium Dioxide | 2.0 | 5.41 |
| Thickener, Fumed Silica | 1.2 | 3.24 |
| Antioxidant[3] | 0.2 | 0.54 |
| Water | 0.4 | 1.08 |
| Selenium Diethyldithiocarbamate | 0.2 | 0.54 |

[1]Clorafin 50 from Monsanto, a light yellow, viscous oil.
[2]Supermultiflex, Diamond Shamrock
[3]2,2'-Methylenebis (4-methyl-6-t-butylphenol).

Portions of the above sealant composition were placed into two small pre-weighted aluminum dishes (approximately 5 cm in diameter×1.5 cm deep) and cured at 70° C. for about 17 hours. The dishes and contents were again weighed and one placed in a 100° C. open-draft oven and the other placed in a 150° C. open-draft oven and weighed periodically for 1 week. The experiment was repeated except 2.40 gms of a 50 wt % lead dioxide curing paste (C-5500 from G. P. Roeser, Inc.) was substituted for the selenium diethyldithiocarbamate curing agent. Lead dioxide is a common curing agent for mercaptan-terminated polymer-based compositions and was tested for comparative purposes. The results of these tests are shown in Table II below where it is seen that not only less curing agent is used with the selenium diethyldithiocarbamate but the thermal properties of the cured sealant at 150° C. are significantly better.

TABLE II.

Effect of Heat on Stability of Cured Elastomeric Compositions

| | Percent Weight Loss After X Days | | | |
|---|---|---|---|---|
| | Lead Dioxide Curing Agent | | Selenium Diethyldithiocarbamate Curing Agent | |
| Days | 100° C. | 150° C. | 100° C. | 150° C. |
| 1 | 0.31 | 1.22 | 0.34 | 1.03 |
| 2 | 0.31 | 1.77 | 0.45 | 1.37 |
| 3 | 0.31 | 1.77 | 0.34 | 1.60 |
| 4 | — | — | — | — |
| 5 | 0.45 | 2.45 | — | — |
| 6 | 0.76 | 5.44 | 0.57 | 2.74 |
| 7 | 0.77 | 12.92 | 0.57 | 3.76 |

The above experiment was repeated except that a mercaptan-terminated polysulfide polymer (LP®-32 from Thiokol) was used in place of the polyether-polyester polymer of the current invention with the selenium diethyldithiocarbamate curing agent. The mercaptan-terminated polysulfide polymer-based composition did not cure at either the normal 70° C. cure temperature or at the elevated temperatures (100° C. and 150° C.) of the test. The polysulfide-based composition can be cured with lead dioxide which illustrates the selectivity of the current invention.

EXAMPLE III

The thermal stability tests described in Example II were repeated except other common metal oxide curing agents were used, again for comparitive purposes. The amount of curing agents used was slightly different in each case to adjust for molecular weight differences, concentrations, etc. Generally, the amount of metal oxide curing agents employed were calculated to be about 25 wt % in excess of stoichiometric. The results which are listed in Table III below show that polyether-polyester mercaptan-terminated polymer-based compositions of the current invention when cured with other common metal oxide curing agents have good thermal stability at 100° C. but poor thermal stability at 150° C.

TABLE III.

Effect of Heat on Stability of Cured Elastomeric Compositions

| | Percent Weight Loss After X Days | | | | | |
|---|---|---|---|---|---|---|
| | Calcium Peroxide Curing Agent[a] | | Zinc Peroxide Curing Agent[b] | | Manganese Dioxide Curing Agent[c] | |
| Days | 100° C. | 150° C. | 100° C. | 150° C. | 100° C. | 150° C. |
| 1 | 0.28 | 0.40 | 0.19 | 0.98 | 0.31 | 1.21 |
| 2 | 0.28 | 0.60 | 0.28 | 1.36 | 0.41 | 2.83 |
| 3 | 0.56 | 0.80 | 0.38 | 2.15 | 0.51 | 6.88 |
| 6 | — | — | — | — | 0.51 | 25.50 |
| 7 | 0.38 | 26.50 | 0.47 | 9.17 | 0.51 | 28.74 |

[a]40 Wt. % CaO$_2$ from G. P. Roeser, Inc. Employed 0.5 gms plus 0.1 gms Ca(OH)$_2$
[b]50 Wt. % ZnO$_2$ from G. P. Roeser, Inc. Employed 0.5 gms plus 0.1 gms tetramethylthiuram-disulfide (Methyl Tuads).
[c]35 Wt. % MnO$_2$ from G. P. Roeser, Inc. Employed 0.65 gms plus 0.1 gms Methyl Tuads.

EXAMPLE IV

The following example illustrates that cured bulk performance properties of the present invention involving the selenium-based curing agent are comparable and in some cases superior to those bulk performances properties of a similar composition cured with a common metal oxide curing agent, lead dioxide. A slightly different sealant recipe was employed than previously described that uses less mercaptan-terminated polymer.

Sealant Recipe[1]

| Ingredients | grams | wt. % |
|---|---|---|
| Polymer (from Example I) | 21.0 | 30.03 |
| Plasticizer, Chlorinated Paraffin[2] | 2.9 | 4.15 |
| Fillers, Calcium Carbonate[3] | 29.6 | 42.35 |
| Titanium Dioxide | 14.1 | 20.17 |
| Thickener, Fumed Silica | 1.9 | 2.72 |
| Antioxidant[4] | 0.2 | 0.29 |
| Selenium Diethyldithiocarbamate | 0.2 | 0.29 |

[1]No water needed in formulation because of high filler level.
[2]Clorafin 50 from Monsanto, a light yellow, viscous oil.
[3]Hi Pflex 100 from Pfizer Minerals.
[4]2,2'-Methylenebis (4-methyl-6-t-butylphenol)

A portion of the above composition was placed in a 6.35 cm (2.5 in.)×6.35 cm (2.5 in.)×0.32 cm (0.125 in.) picture-frame mold and cured at 70° C. for 72 hours and cured bulk performance property tested in accordance with ASTM D-888-56T. Canvas peel test specimens were also prepared with the above composition on unprimed clean glass surfaces, cured at 70° C. for 72 hours and tested according to Federal Specification TT-S-227e for elastomeric multi-component sealants and tested in duplicate on an Instron tester (Model TT) at a cross-head speed of 2 in./min. These results are in Table IV and show the properties to be comparable to a similar sealant composition cured with lead dioxide (1.3 gms of a 50 wt % PbO$_2$ from G. P. Roeser, Inc.). The composition using the selenium-based curing agent appears to have slightly better tensile strength and elongation than the lead-cured system, although the adhesive strength on glass is significantly lower but still at an acceptable level. The selenium-based cured sealant composition has a non-tacky surface compared to the slightly tacky surface of the lead cured system which can be important when dustfree surfaces are required.

TABLE IV.

Performance Properties of Cured Sealant Composition

| | PbO$_2$ Curing Agent | | [(C$_2$H$_5$)$_2$NCSS]$_4$Se Curing Agent | |
|---|---|---|---|---|
| Performance Properties | psi | MPa | psi | MPa |
| A. Bulk Properties | | | | |
| 1. Modulus, 50%[1] | 69 | 0.475 | 74 | 0.510 |
| 2. Tensile Strength[1] | 128.5 | 0.886 | 209.8 | 1.447 |
| 3. Elongation, %[1] | 412.5 | 2.844 | 537.5 | 3.706 |
| 4. Surface Condition | Slight Tack | | Non-tacky | |
| B. Canvas Peel Strength[2] on Unprimed Glass | 17.3 ppiw (3.02 k N/m) | | 7.5 ppiw (1.31 k N/m) | |

[1]ASTM D-88-56T
[2]Federal Specification TT-S-227e for elastomeric multi-component sealants, National Bureau of Standards.

EXAMPLE V

The elastomeric sealant composition described in Example IV was again formulated except zinc dibutyldithiocarbamate was used as a curing agent instead of selenium diethyldithiocarbamate. The composition did not cure when heated in a manner similar to that employed for the selenium-based composition. This example illustrates the selectivity of the curing agent in the present invention compositions.

The polyether-polyester mercaptan-terminated polymer-based compositions when cured with a selenium dialkyl dithiocarbamate have better thermal stability at elevated temperatures (150° C.) than when the same compositions are cured with metal oxides. The selenium-based cured compositions have comparable cured performance preoperties to similar compositions cured with metal oxides.

The selenium disubstituted dithiocarbamate curing agent is selective in the type of mercaptan-terminated polymer-based composition that it can cause to cure. Mercaptan-terminated polyether-polyester polymer-based compositions will cure with the selenium-based curing agent whereas mercaptan-terminated polysulfide polymer-based compositions will not cure.

The mercaptan-terminated polyether-polyester polymer-based composition is sensitive to cure with Group VI A metal (i.e. selenium) dialkyldithiocarbamate but not to other metal (i.e. zinc) dialkyldithiocarbamate.

The thermal stability data is summarized as follows:

TABLE V.

| | Thermal Stability Summary | |
|---|---|---|
| | Wt % Loss After 7 Days | |
| Curing Agent | 100° C. | 150° C. |
| Lead Dioxide | 0.77 | 12.9 |
| Calcium Dioxide | 0.38 | 26.5 |
| Zinc Dioxide | 0.47 | 9.2 |
| Manganese Dioxide | 0.51 | 28.7 |
| Selenium Diethyldithiocarbamate | 0.57 | 3.8 |

Reasonable variation and modification are possible within the scope of the foregoing disclosure in the appended claims to the invention the essence of which is that a mercaptan-terminated polyether-polyester liquid polymer sealant composition is cured to give significantly improved thermal stability by providing therein a curing agent or compound which is at least one of an organo selenium and an organo tellurium compound e.g. a selenium and/or a tellurium N-substituted dithiocarbamate.

Preferred liquid mercaptan-terminated polymers useful in the current invention are those materials comprised of at least two but preferably more than two pendent thiol groups per molecule and which have a plurality of ether (alkoxy) and ester groups with monosulfide linkages. In addition, the polymers will generally have the following properties:

| | Broad | Preferred |
|---|---|---|
| Weight Percent Mercaptan (% SH) | 0.3–5.0 | 0.7–1.5 |
| Weight Average Molecular Weight ($M_w$) | 5,000–40,000 | 10,000–20,000 |
| Viscosity, centipoise (cps.) at 25° C. | 2,000–40,000 | 4,000–20,000 |

I claim:

1. A sealant composition comprising a mercaptan-terminated polyether-polyester liquid polymer and at least one of an organo selenium and an organo tellurium curing agent or compound.

2. A composition according to claim 1 wherein the curing agent is at least one of a selenium and a tellurium N-substituted dithiocarbamate curing agent.

3. A composition according to claim 2 wherein the curing agent is a compound having the general formula $$[(R^1R^2)_2NCSS]_4M$$

wherein $R^1$ and $R^2$ can be selected from the group consisting of hydrogen, alkyl, or cycloalkyl radical consisting from $C_1$ to $C_{12}$ and wherein $R^1$ and $R^2$ cannot both be hydrogen; and M can be either selenium or tellurium.

4. A composition according to claim 3 wherein the compound is at least one of the following:
selenium dimethyldithiocarbamate,
selenium ethyldithiocarbamate,
selenium diethyldithiocarbamate,
selenium propyldithiocarbamate,
selenium dipropyldithiocarbamate,
selenium dibutyldithiocarbamate,
selenium dipentyldithiocarbamate,
selenium dihexyldithiocarbamate,
selenium methylethyldithiocarbamate,
tellurium methyldithiocarbamate,
tellurium dimethyldithiocarbamate,
tellurium diethyldithiocarbamate,
tellurium cyclohexyldithiocarbamate, and
tellurium cyclohexylethyldithiocarbamate.

5. A method of curing a mercaptan-terminated polyether-polyester liquid polymer which comprises admixing the same, optionally together with other usual ingredients for a sealant composition, with at least one of an organo selenium and an organo tellurium curing agent.

6. A method according to claim 5 wherein the curing agent is at least one of a selenium and a tellurium N-substituted dithiocarbamate.

7. A method according to claim 7 wherein the curing agent is represented by the formula $$[(R^1R^2)_2NCSS]_4M$$

wherein $R^1$ and $R^2$ can be selected from the group consisting of hydrogen, alkyl, or cycloalkyl radical consisting from $C_1$ to $C_{12}$ and wherein $R^1$ and $R^2$ cannot both be hydrogen; and M can be either selenium or tellurium.

8. A method according to claim 8 wherein the curing agent is at least one selected from the following:
selenium dimethyldithiocarbamate,
selenium ethyldithiocarbamate,
selenium diethyldithiocarbamate,
selenium propyldithiocarbamate,
selenium dipropyldithiocarbamate,
selenium dibutyldithiocarbamate,
selenium dipentyldithiocarbamate,
selenium dihexyldithiocarbamate,
selenium methylethyldithiocarbamate,
tellurium methyldithiocarbamate,
tellurium dimethyldithiocarbamate,
tellurium diethyldithiocarbamate,
tellurium cyclohexyldithiocarbamate, and
tellurium cyclohexylethyldithiocarbamate.

9. A composition according to claim 1 wherein said polymer is a mercaptan-terminated polyether-polyester liquid comprised of at least two but preferably more than two pendent thiol groups per molecule and which have a plurality of ether (alkoxy) and ester groups with monosulfide linkages and having a weight percent mercaptan of 0.3 to 5.0; a weight average molecular weight ($M_w$) of 5,000 to 40,000; and a viscosity of 2,000 to 40,000 centipoise at 25° C.

10. A composition according to claim 9 wherein said polymer has a weight percent mercaptan of 0.7 to 1.5; a weight average molecular weight ($M_w$) of 10,000 to 20,000; and a viscosity of 4,000 to 20,000 centipoise at 25° C.

* * * * *